US011699360B2

(12) United States Patent
Koul et al.

(10) Patent No.: US 11,699,360 B2
(45) Date of Patent: Jul. 11, 2023

(54) AUTOMATED REAL TIME INTERPRETER SERVICE

(71) Applicant: Microsoft Technology Licensing, LLC, Redmond, WA (US)

(72) Inventors: Anirudh Koul, San Jose, CA (US); Meher Kasam, San Francisco, CA (US); Michael Johnston, Los Gatos, CA (US); Swetha Machanavajhala, Redmond, WA (US); Elizabeth Halper, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 15 days.

(21) Appl. No.: 17/106,901

(22) Filed: Nov. 30, 2020

(65) Prior Publication Data

US 2021/0082315 A1 Mar. 18, 2021

Related U.S. Application Data

(63) Continuation of application No. 15/730,176, filed on Oct. 11, 2017, now Pat. No. 10,854,110.

(Continued)

(51) Int. Cl.
*G09B 21/00* (2006.01)
*H04M 11/02* (2006.01)
(Continued)

(52) U.S. Cl.
CPC ............ *G09B 21/009* (2013.01); *G10L 15/26* (2013.01); *H04M 1/2475* (2013.01);
(Continued)

(58) Field of Classification Search
None
See application file for complete search history.

(56) References Cited

U.S. PATENT DOCUMENTS 6,701,162 B1 * 3/2004 Everett ............ H04M 1/72478
704/235
9,172,790 B2 * 10/2015 Garg ................ H04M 1/72478
(Continued)

OTHER PUBLICATIONS

Bharthi et al., "Unit selection based speech synthesis for converting short text message into voice message in mobile phones", Jan. 1, 2017, IEEE, 2017 4th International Conference on Advanced Computing and Communication Systems (ICACCS) (pp. 1-7) (Year: 2017).*

(Continued)

*Primary Examiner* — Davoud A Zand

(57) ABSTRACT

Aspects of the present disclosure relate to systems and methods that aid users with hearing and/or speech impediments to have a conversation with a remote phone number without human assistance. In one aspect, an application residing on a user's device, such as a smartphone, tablet computer, laptop, etc., may be used to initiate a phone call to a recipient. Upon initiating the phone call locally, a service residing on the server may receive a request to initiate a connection to the recipient. Once the recipient answers, the user may converse with the recipient by providing text input to their local app. The text input may be transmitted to the service. The service may use a text to speech converter to translate the received text to speech that can be delivered to the recipient.

18 Claims, 7 Drawing Sheets

Related U.S. Application Data

(60) Provisional application No. 62/466,859, filed on Mar. 3, 2017.

(51) Int. Cl.
*H04M 1/247* (2021.01)
*H04M 3/42* (2006.01)
*G10L 15/26* (2006.01)
*H04M 1/72478* (2021.01)
*H04M 11/06* (2006.01)
*G09B 5/06* (2006.01)

(52) U.S. Cl.
CPC ... *H04M 1/72478* (2021.01); *H04M 3/42382* (2013.01); *H04M 3/42391* (2013.01); *H04M 11/02* (2013.01); *G09B 5/06* (2013.01); *H04M 11/066* (2013.01); *H04M 2201/39* (2013.01)

(56) References Cited

U.S. PATENT DOCUMENTS

| | | | |
|---|---|---|---|
| 9,948,772 B2* | 4/2018 | Miller | H04L 12/1818 |
| 2002/0159572 A1* | 10/2002 | Fostick | H04L 51/066 |
| | | | 379/88.14 |
| 2003/0110038 A1* | 6/2003 | Sharma | G10L 17/10 |
| | | | 704/E17.009 |
| 2003/0163310 A1* | 8/2003 | Caldwell | H04M 1/2475 |
| | | | 704/235 |
| 2013/0281046 A1* | 10/2013 | Sennett | H04W 4/90 |
| | | | 455/404.1 |
| 2017/0078490 A1* | 3/2017 | Kaminsky | H04M 7/0039 |
| 2017/0195484 A1* | 7/2017 | Geroe | H04M 3/42042 |

OTHER PUBLICATIONS

Watada et al., "Speech Recognition in a Multi-speaker Environment by Using Hidden Markov Model and Mel-frequency Approach", May 1, 2016, IEEE, 2016 Third International Conference on Computing Measurement Control and Sensor Network (CMCSN) (pp. 80-83) (Year: 2016).*

* cited by examiner

AUTOMATED REAL TIME INTERPRETER SERVICE

This application is a continuation of U.S. patent application Ser. No. 15/730,176, filed on Oct. 11, 2017, now issued as U.S. Pat. No. 10,854,110, which application claims priority to U.S. Provisional Patent Application No. 62/466,859, entitled "Automated Real Time Interpreter Service," filed on Mar. 3, 2017, the disclosures of which are hereby incorporated by reference in their entireties.

BACKGROUND

Users with hearing and/or speech impairments cannot make phone calls unassisted. In order to make a phone call, a user relies upon an interpreter which can be costly and requires scheduling time with an interpreter in advance.

It is with respect to these and other general considerations that the aspects disclosed herein have been made. Also, although relatively specific problems may be discussed, it should be understood that the examples should not be limited to solving the specific problems identified in the background or elsewhere in this disclosure.

SUMMARY

Aspects of the present disclosure relate to systems and methods that aid users with hearing and/or speech impediments to have a conversation with a remote phone number without human assistance. In one aspect, an application residing on a user's device, such as a smartphone, tablet computer, laptop, etc., may be used to initiate a phone call to a recipient. Upon initiating the phone call locally, a service residing on the server may receive a request to initiate a connection to the recipient. Once the recipient answers, the user may converse with the recipient by providing text input to their local app. The text input may be transmitted to the service. The service may use a text to speech converter to translate the received text to speech that can be delivered to the recipient. Spoken responses from the recipient may also be received by the service and translated into text. The translated text may be provided to the application on the user's local device for display. The service may also provide additional features such as gender recognition, voice selection, amplitude association for transcription visualization, and emotion recognition for transcription visualization, among other services.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Non-limiting and non-exhaustive examples are described with reference to the following figures.

DETAILED DESCRIPTION

Figure 1:
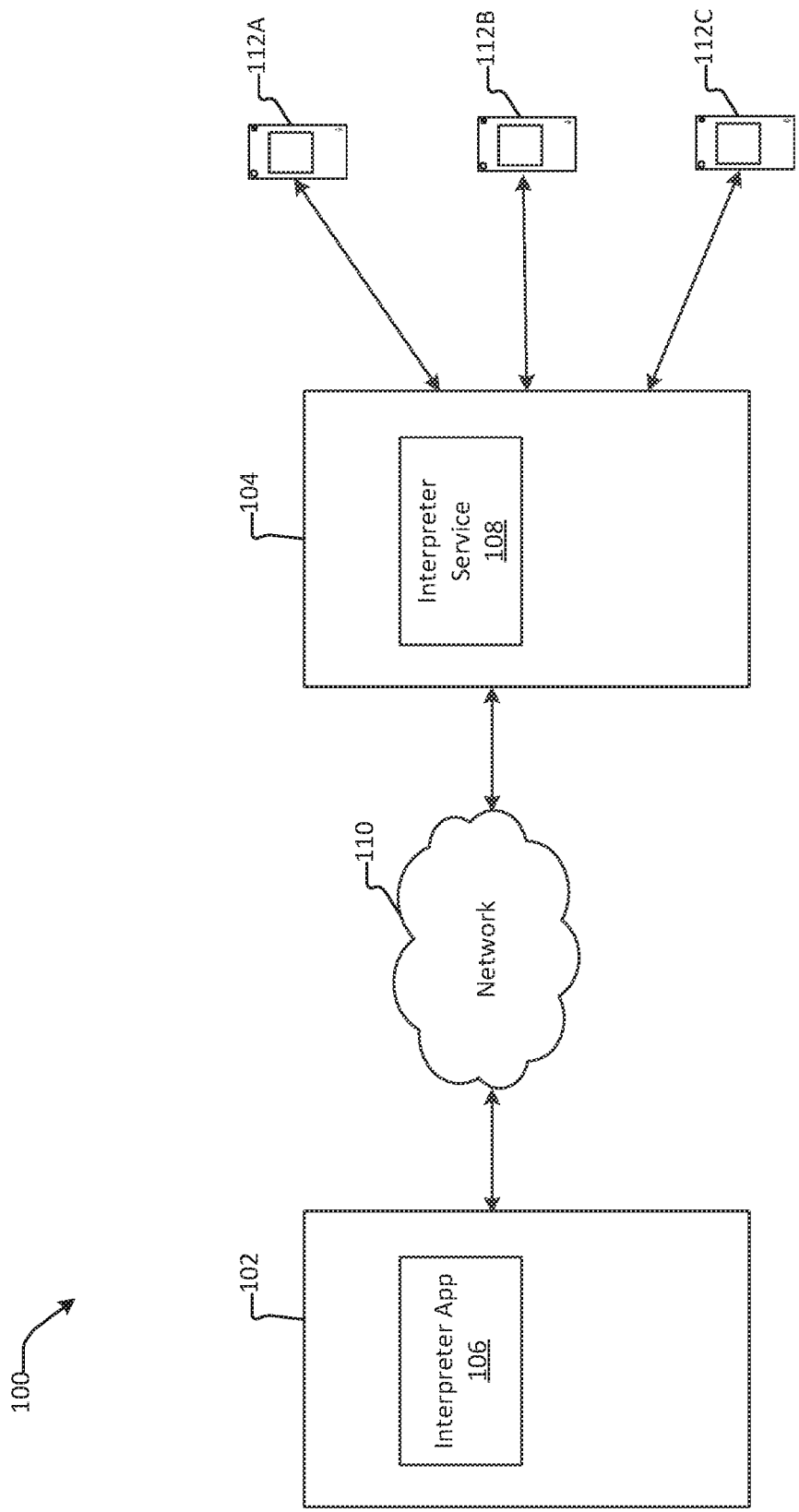
FIG. 1 illustrates an overview of an exemplary system for providing an automated interpreter service.

Various aspects of the disclosure are described more fully below with reference to the accompanying drawings, which form a part hereof, and which show specific example aspects. However, different aspects of the disclosure may be implemented in many different forms and should not be construed as limited to the aspects set forth herein; rather, these aspects are provided so that this disclosure will be thorough and complete, and will fully convey the scope of the aspects to those skilled in the art. Aspects may be practiced as methods, systems or devices. Accordingly, aspects may take the form of a hardware implementation, an entirely software implementation or an implementation combining software and hardware aspects. The following detailed description is, therefore, not to be taken in a limiting sense.

Aspects of the present disclosure relate to systems and methods that aid users with hearing and/or speech impediments to have a conversation with a remote phone number without human assistance. Historically a telecommunication relay service was used to aid in phone calls. A telecommunication relay service involves having a third party interpreter sitting in the middle of the call to help communicate with both the parties. The human interpreter receives the text message from the caller, speaks that to the call receiver, hears their reply and types it back to the caller. This often involves having dedicated hardware to type and receive text output. Some hardware for Video relay service enables user to communicate through sign language to the interpreter.

Telecommunication relay services have a number of significant drawbacks. For example, the reliance on an interpreter is costly and often requires a user to schedule time with the interpreter in advanced. Use of this services also result in a sever loss of privacy due to the involvement of a third party. Additionally, users may not be able to make some specific types of calls due to the presence of an interpreter. For example, federal laws prohibit anyone other than the user to call banks, credit card companies, and other agencies where highly private and critical information exchange such as credit cards, pin codes is involved. Even if the use of an interpreter is not prohibited by law, there have been several reported cases of fraud performed by the third party services. Finally, the dedicated hardware required to use a telecommunication relay service.

Aspects of the present disclosure address these and other problems by providing an automated service that allows users with hearing or speech impediments to make a phone call. In one aspect, an application residing on a user's device, such as a smartphone, tablet computer, laptop, etc., may be used to initiate a phone call to a recipient. Upon initiating the phone call locally, a service residing on the server may receive a request to initiate a connection to the recipient. Once the recipient answers, the user may converse with the recipient by providing text input to their local app.

The text input may be transmitted to the service. The service may use a text to speech converter to translate the received text to speech that can be delivered to the recipient. Spoken responses from the recipient may also be received by the service and translated into text. The translated text may be provided to the application on the user's local device for display. The service may also provide additional features such as gender recognition, voice selection, amplitude association for transcription visualization, and emotion recognition for transcription visualization, among other services.

FIG. 1 illustrates an overview of an exemplary system 100 for providing an automated interpreter service. System 100 may include a user device 102 that is operable to connect to a server 104 via a network 110. User device 102 may be any type of computing device operable to receive textual input and display responses. Exemplary devices include, but are not limited to, smartphones, laptops, tablet computers, etc. An interpreter Application 106 may be used to initiate a call with a recipient. The interpreter application 106 may initiate a connection with an interpreter service 108 residing on server 104. The interpreter service 108 may establish a connection with one or more recipient devices, such as recipient devices 112A-C depicted in system 100. Upon initiated a connection with a recipient device, such as, for example, recipient device 112A, the interpreter service 108 may transmit prerecorded audio to the recipient device. The prerecorded audio may inform the recipient that an automated interpreter service 108 is being used to facilitate a call with a hearing or speech impaired user.

Upon establishing the connection, interpreter application 106 may receive text input from a user via a user interface. The text input received by interpreter application 106 may be transmitted to the interpreter service 108 via the network 110. Upon receiving the text, interpreter service 108 may process the text in order to convert the text to speech. The speech generated by the interpreter service may then be delivered to the recipient device 112A.

The interpreter service 108 may also be operable to receive spoken input from a recipient device, such as recipient device 112A. The received spoken input may be process in order to convert the spoken input to text. The converted text may then be delivered to user device 112. The interpreter application 106 may receive the converted text and display the converted text to the user. In doing so, the interpreter service 108 may facilitate a phone conversation between a hearing or speech impaired user and a recipient.

Additional features may also be provided by the system 100. One additional service may be gender recognition. The interpreter service 108 may process a recipient's voice in order to determine if the recipient is a male or female. Upon determining the recipient's gender, the gender information may be transmitted to the interpreter application 106. The interpreter application 106 may use the gender information to display an indication to the user of the recipient's gender.

Another additional service may be voice selection for the user. Upon initiating the call, or at an earlier time, the user may provide information about the user to the interpreter service 108. The provided information may be used by the interpreter service to select a gender, age, and nationality for the user. The selected gender, age, and nationality may be used to select an appropriate voice for a text to speech process. In doing so, the interpreter service 108 may select a voice that represents the user's gender, age, and nationality, thereby conveying information about the user to the recipient. In certain aspects, a user may be able to change their gender, age, and/or nationality. In response, the interpreter service 108 may select a different speech to text process for the user.

The interpreter service 108 may also perform amplitude association. In one example, upon initiating a connection with the recipient, the interpreter service 108 may initially analyze the amplitude of the speech received from the recipient in order to determine a baseline amplitude. Upon determining the baseline amplitude, the interpreter service 108 may compare newly received speech from the recipient against the baseline amplitude to determine if the recipient is speaking louder or softer. In one example, changes in amplitude may be conveyed to the interpreter application 106. The interpreter application 106 may use changes in the amplitude to alter the display of the text presented to the user. For example, if the recipient is speaking louder, such as shouting, the font size of the displayed text may be increased. If the recipient is speaking softer, such as whispering, the font size of the displayed text may be decreased. While examples provided herein describe the interpreter application 106 as determining a font size for the displayed text based upon amplitude information, in alternate examples the determination of text size may be performed by the interpreter service 108.

Emotional recognition may also be provided by the system 100. Upon receiving speech from the recipient, the interpreter service 108 may determine the recipient's current emotional state (e.g., angry, sad, happy, excited, neutral). The determined emotional state may be used to alter the display of the displayed text. For example, the sentence of the transcribed text displayed to the user may be displayed in a certain color depending on the recipient's emotional state.

While the aspects described thus far relate to a conversation between a user and a single recipient, in further aspects the interpreter service may be extended to a multi-caller conference call. In such examples, upon receiving speech from a recipient device, the interpreter service 108 may transcribe the received speech and identify the recipient who provided the speech. The recipient's name may then be transmitted to the interpreter application 106 with the transcribed sentence. The interpreter application 106 may then display the transcribed sentence in association with the recipient's name, thereby allowing the user to know who spoke the transcribed text. In one example, the recipient may be identified based upon the device that transmitted the spoken input to the interpretation service 108.

In yet another example, the interpreter service 108 may be operable to determine when multiple recipients are speaking into a single device. For example, voice analysis may be performed to identify different speakers. When multiple speakers are identified, the recipient service 108 may transmit an indication of which speaker should be associated with the transcribed text. The interpreter application 106 may display an indication of which speaker spoke the transcribed text when displaying the text.

Figure 2:
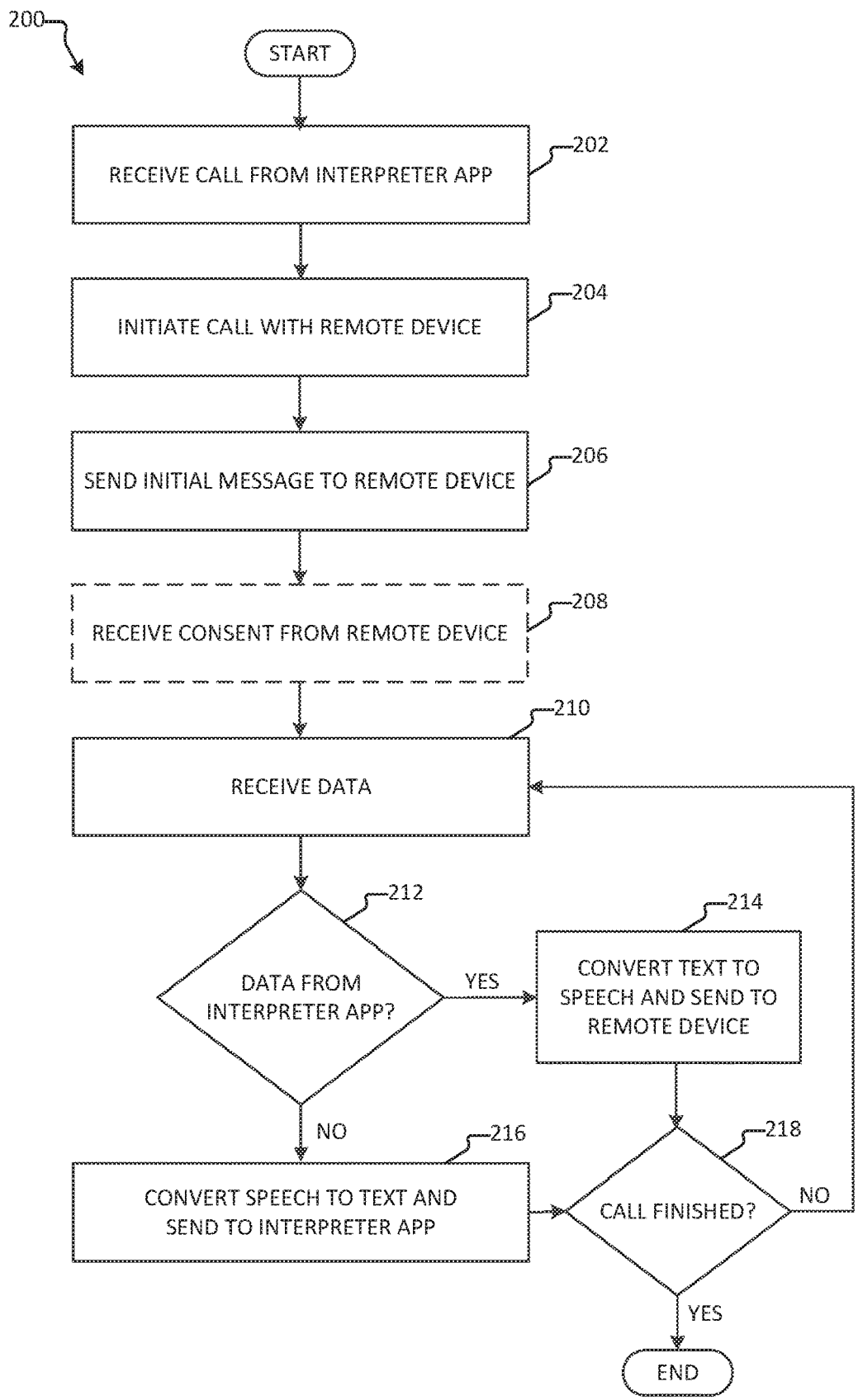
FIG. 2 illustrates an exemplary method 200 of providing an automated interpreter service.

FIG. 2 illustrates an exemplary method 200 of providing an automated interpreter service. In one example, the method 200 may be performed by a device, such as server device 104. Flow begins at operation 200 where a call is received from a device. In one example, the received call may be initiated by an interpreter application residing on a user's device. Upon receiving the call, flow continues to operation 202. At operation 202, a call may be initiated with a remote device. The remote device may be identified by information received at operation 202.

Flow continues to operation 206 where an initial message is transmitted to the remote device. The initial message may be a preset audio. The preset audio may be used to inform the recipient that they are speaking with the user via an automated interpreter service. Flow may then continue to optional operation 208. In some aspects, the recipient may have to consent to speak with the user via the automated interpreter service. In such aspects, consent may be received at optional operation 208.

Flow continues to operation 210 where data is received. The received data may originate from the recipient device or the users device. The received data may be spoken audio or text. Flow continues to decision operation 212 where a determination is made as to whether the received data is from an interpreter application. If the received data is from the interpreter application, flow branches yes to operation 214. At operation 214, text data received from the interpreter application is converted to speech. The converted speech may then be sent to the recipient device. Upon sending the converted text to the recipient device, flow continues to decision operation 218.

Returning to decision operation 212, if the data is not received from the interpreter application, that is, the data is spoken data received by the recipient, flow branches No to operation 216. At operation 216, the speech received from the recipient device is converted to text and sent to the interpreter application. Flow then continues to decision operation 218 where a determination is made as to whether the call is ended. If the call has finished, flow branches Yes and the method 200 terminates. If, however, the call has not ended, flow branches No and returns to operation 210. The method 200 then continues in a loop until the call has finished.

FIGS. 3-6 and the associated descriptions provide a discussion of a variety of operating environments in which aspects of the disclosure may be practiced. However, the devices and systems illustrated and discussed with respect to FIGS. 3-6 are for purposes of example and illustration and are not limiting of a vast number of computing device configurations that may be utilized for practicing aspects of the disclosure, described herein.

Figure 3:
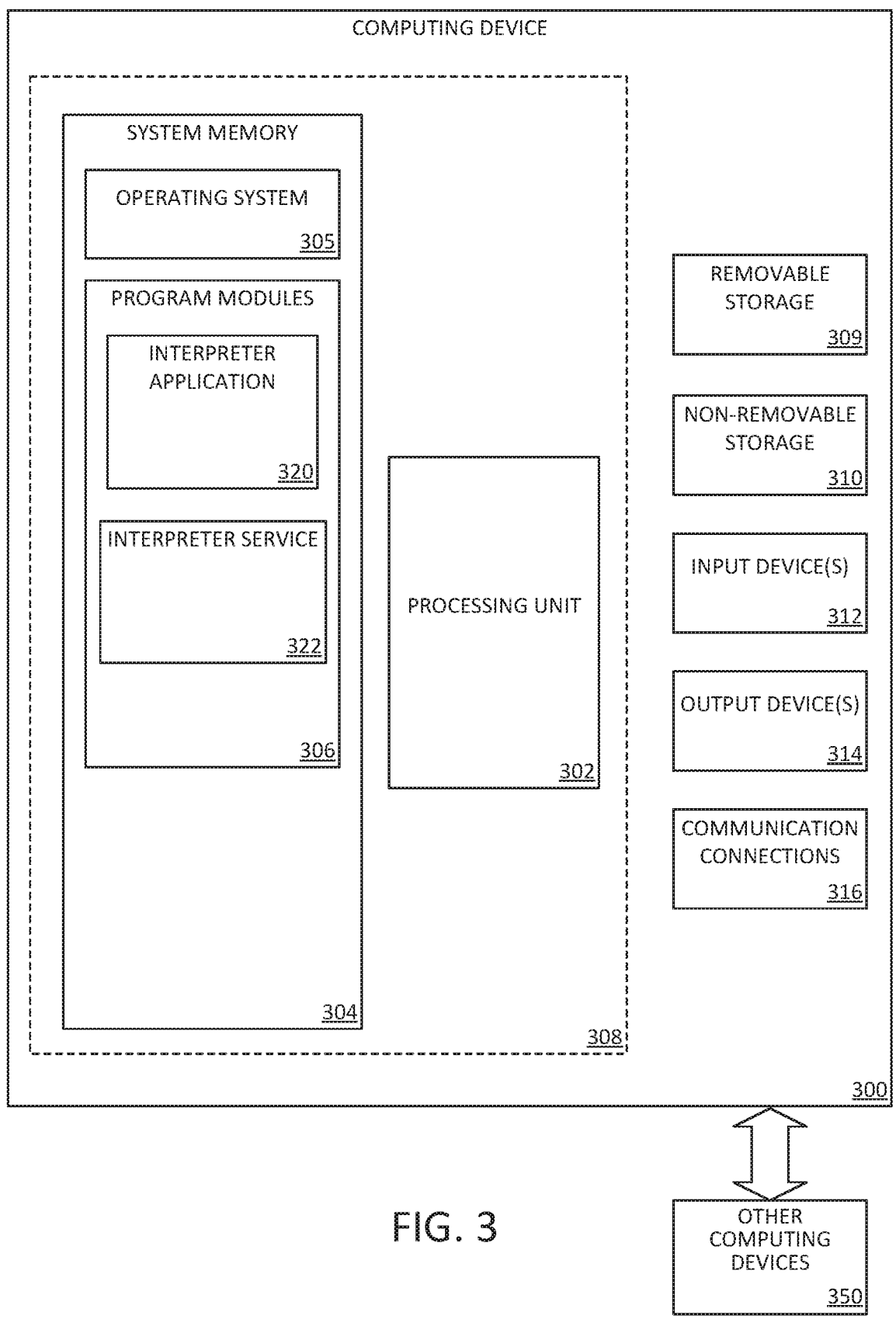
FIG. 3 is a block diagram illustrating example physical components of a computing device with which aspects of the disclosure may be practiced.

FIG. 3 is a block diagram illustrating physical components (e.g., hardware) of a computing device 300 with which aspects of the disclosure may be practiced. The computing device components described below may be suitable for the computing devices described above, including the client computing devices 102A-C and the server computing devices 106A-C. In a basic configuration, the computing device 300 may include at least one processing unit 302 and a system memory 304. Depending on the configuration and type of computing device, the system memory 304 may comprise, but is not limited to, volatile storage (e.g., random access memory), non-volatile storage (e.g., read-only memory), flash memory, or any combination of such memories. The system memory 304 may include an operating system 305 and one or more program modules 306 suitable for performing the various aspects disclosed herein such interpreter application 320 and interpreter service 322 324 and a query reformulation component 326. The operating system 305, for example, may be suitable for controlling the operation of the computing device 300. Furthermore, embodiments of the disclosure may be practiced in conjunction with a graphics library, other operating systems, or any other application program and is not limited to any particular application or system. This basic configuration is illustrated in FIG. 3 by those components within a dashed line 308. The computing device 300 may have additional features or functionality. For example, the computing device 300 may also include additional data storage devices (removable and/or non-removable) such as, for example, magnetic disks, optical disks, or tape. Such additional storage is illustrated in FIG. 3 by a removable storage device 309 and a non-removable storage device 310.

As stated above, a number of program modules and data files may be stored in the system memory 304. While executing on the processing unit 302, the program modules 306 (e.g., interpreter application 320 and/or interpreter service 322) may perform processes including, but not limited to, the aspects, as described herein. Other program modules that may be used in accordance with aspects of the present disclosure may include electronic mail and contacts applications, word processing applications, spreadsheet applications, database applications, slide presentation applications, drawing or computer-aided application programs, etc.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 3 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 300 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

The computing device 300 may also have one or more input device(s) 312 such as a keyboard, a mouse, a pen, a sound or voice input device, a touch or swipe input device, etc. The output device(s) 314 such as a display, speakers, a printer, etc. may also be included. The aforementioned devices are examples and others may be used. The computing device 300 may include one or more communication connections 316 allowing communications with other computing devices 350. Examples of suitable communication connections 316 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 304, the removable storage device 309, and the non-removable storage device 310 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 300. Any such computer storage media may be part of the computing device 300. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 4A:
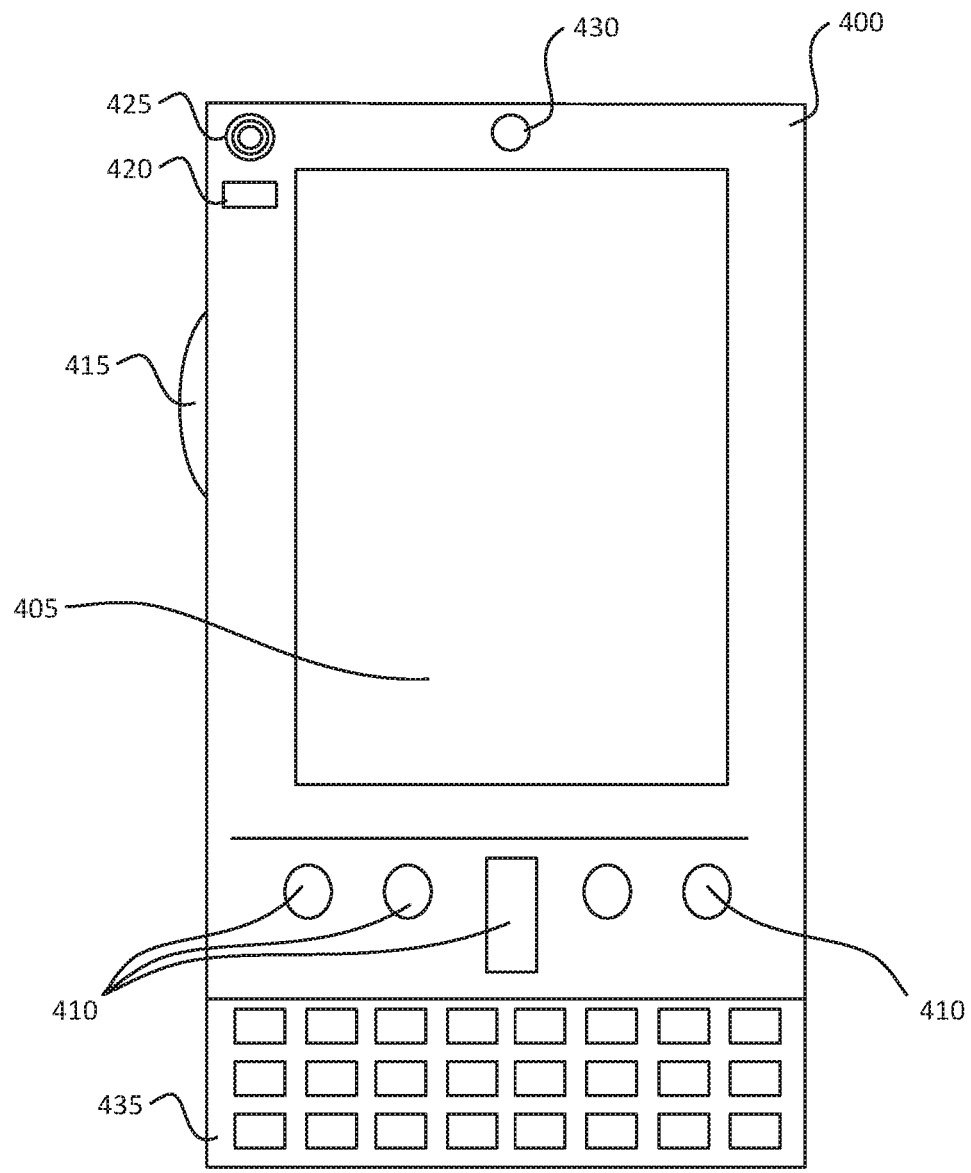
FIGS. 4A and 4B are simplified block diagrams of a mobile computing device with which aspects of the present disclosure may be practiced.
Figure 4B:
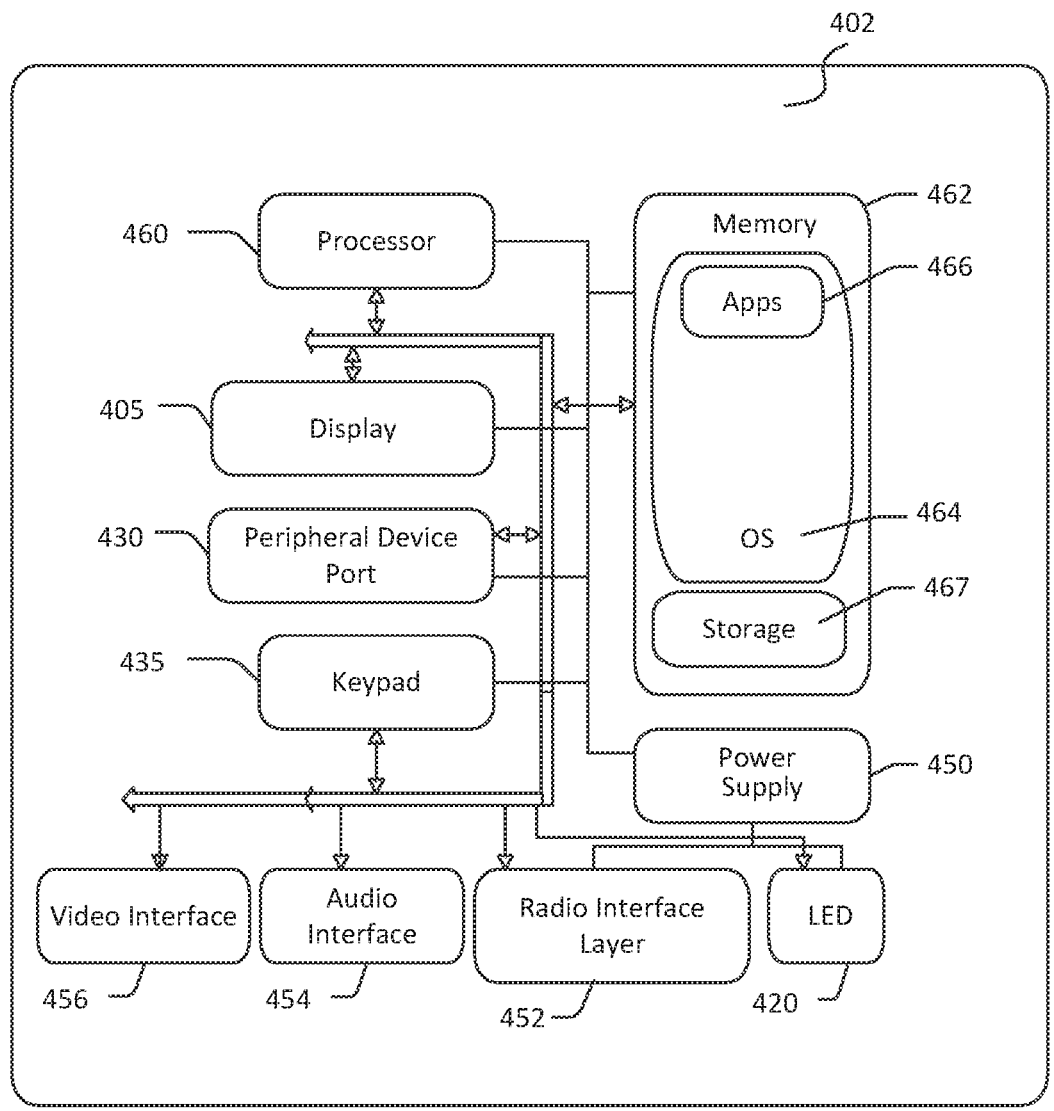

FIGS. 4A and 4B illustrate a mobile computing device 400, for example, a mobile telephone, a smart phone, wearable computer (such as a smart watch), a tablet computer, a laptop computer, and the like, with which embodiments of the disclosure may be practiced. In some aspects, the client may be a mobile computing device. With reference to FIG. 4A, one aspect of a mobile computing device 400 for implementing the aspects is illustrated. In a basic configuration, the mobile computing device 400 is a handheld computer having both input elements and output elements. The mobile computing device 400 typically includes a display 405 and one or more input buttons 410 that allow the user to enter information into the mobile computing device 400. The display 405 of the mobile computing device 400 may also function as an input device (e.g., a touch screen display). If included, an optional side input element 415 allows further user input. The side input element 415 may be a rotary switch, a button, or any other type of manual input element. In alternative aspects, mobile computing device 400 may incorporate more or less input elements. For example, the display 405 may not be a touch screen in some embodiments. In yet another alternative embodiment, the mobile computing device 400 is a portable phone system, such as a cellular phone. The mobile computing device 400 may also include an optional keypad 435. Optional keypad 435 may be a physical keypad or a "soft" keypad generated on the touch screen display. In various embodiments, the output elements include the display 405 for showing a graphical user interface (GUI), a visual indicator 420 (e.g., a light emitting diode), and/or an audio transducer 425 (e.g., a speaker). In some aspects, the mobile computing device 400 incorporates a vibration transducer for providing the user with tactile feedback. In yet another aspect, the mobile computing device 400 incorporates input and/or output ports, such as an audio input (e.g., a microphone jack), an audio output (e.g., a headphone jack), and a video output (e.g., a HDMI port) for sending signals to or receiving signals from an external device.

FIG. 4B is a block diagram illustrating the architecture of one aspect of a mobile computing device. That is, the mobile computing device 400 can incorporate a system (e.g., an architecture) 402 to implement some aspects. In one embodiment, the system 402 is implemented as a "smart phone" capable of running one or more applications (e.g., browser, e-mail, calendaring, contact managers, messaging clients, games, and media clients/players). In some aspects, the system 402 is integrated as a computing device, such as an integrated personal digital assistant (PDA) and wireless phone.

One or more application programs 466 may be loaded into the memory 462 and run on or in association with the operating system 464. Examples of the application programs include phone dialer programs, e-mail programs, personal information management (PIM) programs, word processing programs, spreadsheet programs, Internet browser programs, messaging programs, and so forth. The system 402 also includes a non-volatile storage area 468 within the memory 462. The non-volatile storage area 468 may be used to store persistent information that should not be lost if the system 402 is powered down. The application programs 466 may use and store information in the non-volatile storage area 468, such as e-mail or other messages used by an e-mail application, and the like. A synchronization application (not shown) also resides on the system 402 and is programmed to interact with a corresponding synchronization application resident on a host computer to keep the information stored in the non-volatile storage area 468 synchronized with corresponding information stored at the host computer. As should be appreciated, other applications may be loaded into the memory 462 and run on the mobile computing device 400 described herein (e.g., search engine, extractor module, relevancy ranking module, answer scoring module, etc.).

The system 402 has a power supply 470, which may be implemented as one or more batteries. The power supply 470 might further include an external power source, such as an AC adapter or a powered docking cradle that supplements or recharges the batteries.

The system 402 may also include a radio interface layer 472 that performs the function of transmitting and receiving radio frequency communications. The radio interface layer 472 facilitates wireless connectivity between the system 402 and the "outside world," via a communications carrier or service provider. Transmissions to and from the radio interface layer 472 are conducted under control of the operating system 464. In other words, communications received by the radio interface layer 472 may be disseminated to the application programs 466 via the operating system 464, and vice versa.

The visual indicator 420 may be used to provide visual notifications, and/or an audio interface 474 may be used for producing audible notifications via the audio transducer 425. In the illustrated embodiment, the visual indicator 420 is a light emitting diode (LED) and the audio transducer 425 is a speaker. These devices may be directly coupled to the power supply 470 so that when activated, they remain on for a duration dictated by the notification mechanism even though the processor 460 and other components might shut down for conserving battery power. The LED may be programmed to remain on indefinitely until the user takes action to indicate the powered-on status of the device. The audio interface 474 is used to provide audible signals to and receive audible signals from the user. For example, in addition to being coupled to the audio transducer 425, the audio interface 474 may also be coupled to a microphone to receive audible input, such as to facilitate a telephone conversation. In accordance with embodiments of the present disclosure, the microphone may also serve as an audio sensor to facilitate control of notifications, as will be described below. The system 402 may further include a video interface 476 that enables an operation of an on-board camera 430 to record still images, video stream, and the like.

A mobile computing device 400 implementing the system 402 may have additional features or functionality. For example, the mobile computing device 400 may also include additional data storage devices (removable and/or non-removable) such as, magnetic disks, optical disks, or tape. Such additional storage is illustrated in FIG. 4B by the non-volatile storage area 468.

Data/information generated or captured by the mobile computing device 400 and stored via the system 402 may be stored locally on the mobile computing device 400, as described above, or the data may be stored on any number of storage media that may be accessed by the device via the radio interface layer 472 or via a wired connection between the mobile computing device 400 and a separate computing device associated with the mobile computing device 400, for example, a server computer in a distributed computing network, such as the Internet. As should be appreciated such data/information may be accessed via the mobile computing device 400 via the radio interface layer 472 or via a distributed computing network. Similarly, such data/information may be readily transferred between computing devices for storage and use according to well-known data/information transfer and storage means, including electronic mail and collaborative data/information sharing systems.

Figure 5:
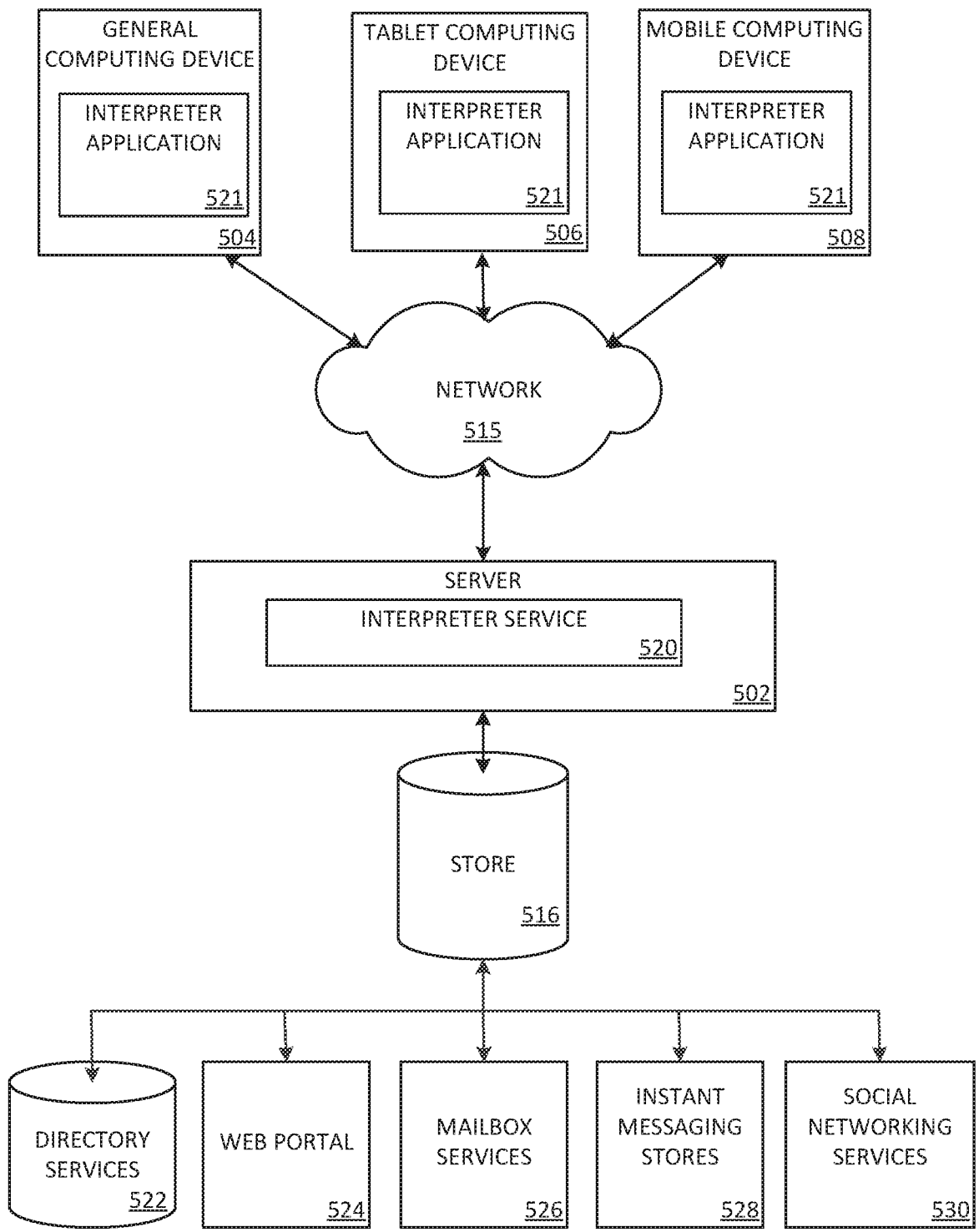
FIG. 5 is a simplified block diagram of a distributed computing system in which aspects of the present disclosure may be practiced.

FIG. 5 illustrates one aspect of the architecture of a system for processing data received at a computing system from a remote source, such as a personal computer 504, tablet computing device 506, or mobile computing device 508, as described above. Content displayed at server device 502 may be stored in different communication channels or other storage types. For example, various documents may be stored using a directory service 522, a web portal 524, a mailbox service 526, an instant messaging store 528, or a social networking site 530. Interpreter application 521 may be employed by a client that communicates with server device 502, and/or interpreter service 520 may be employed by server device 502. The server device 502 may provide data to and from a client computing device such as a personal computer 504, a tablet computing device 506 and/or a mobile computing device 508 (e.g., a smart phone) through a network 515. By way of example, the computer system described above may be embodied in a personal computer 504, a tablet computing device 506 and/or a mobile computing device 508 (e.g., a smart phone). Any of these embodiments of the computing devices may obtain content from the store 516, in addition to receiving graphical data useable to be either pre-processed at a graphic-originating system, or post-processed at a receiving computing system.

Figure 6:
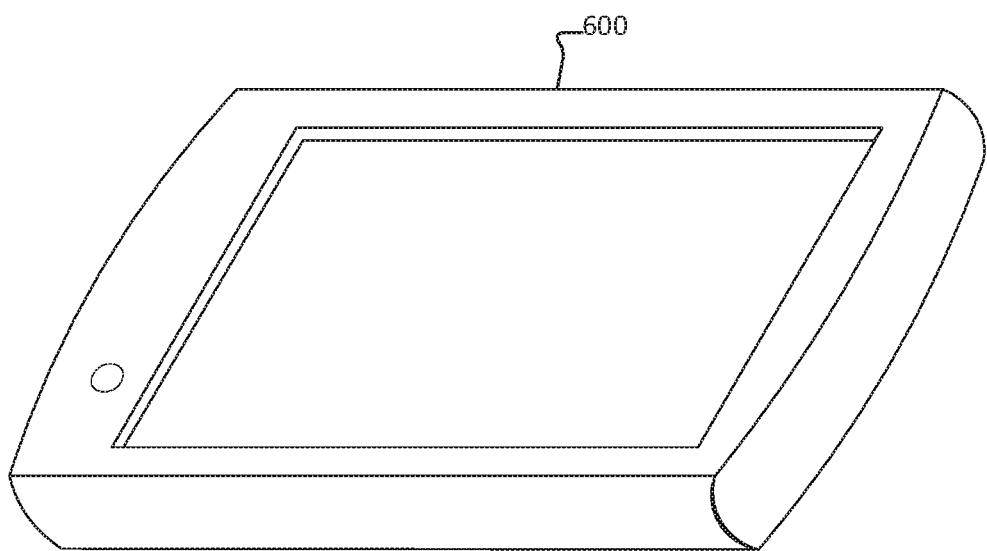
FIG. 6 illustrates a tablet computing device for executing one or more aspects of the present disclosure.

FIG. 6 illustrates an exemplary tablet computing device 600 that may execute one or more aspects disclosed herein. In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A method of a real-time communication initiated by a voice caller to a non-voice callee, the method comprising:
   receiving, by an interpreter application used by the non-voice callee, voice call initiation data from the voice caller, wherein the interpreter application communicates the voice call initiation data to the non-voice callee based on text data;
   establishing a voice phone call with the voice caller based on the voice call initiation data;
   receiving, by the interpreter application, speech data from the voice caller;
   analyzing the speech data to determine a feature of the speech data, wherein the feature comprises one or more of: a gender of the voice caller, an identity of the voice caller, an emotional state of the voice caller, or an amplitude;
   converting, by the interpreter application, the speech data to text data; and
   providing the text data to the non-voice callee with one or more indications based on the determined feature.

2. The method of claim 1, wherein the interpreter application is associated with a service.

3. The method of claim 1, further comprising:
   analyzing the speech data to determine a gender of the voice caller; and
   providing the text data to the non-voice callee with an indication of the gender of the voice caller.

4. The method of claim 3, wherein the indication of the gender is a font of the text data.

5. The method of claim 1, further comprising:
   analyzing the speech data to determine an identity of the voice caller; and
   providing the text data to the non-voice callee with an indication of the identity of the voice caller.

6. The method of claim 1, further comprising:
analyzing the speech data to determine an emotional state of the voice caller; and
modifying the text data to indicate the emotional state of the voice caller.

7. The method of claim 1, further comprising:
analyzing the speech data to determine an amplitude; and
modifying the text data to indicate the amplitude of the speech data.

8. A system, comprising:
at least one processor; and
at least one memory storing computer-executable instructions that when executed cause the at least one processor to:
receive, by an interpreter application used by a non-voice callee, voice call initiation data, wherein the voice call initiation data is operable to establish a voice phone call between the non-voice callee and two or more voice callers;
receive, by the interpreter application, speech data from the two or more voice callers;
associate a first portion of the speech data with a first voice caller of the two or more voice callers and a second portion of the speech data with a second voice caller of the two or more voice callers;
receive, by the interpreter application, a first gender of the first voice caller and a second gender of the second voice caller, the first and second genders being based on the speech data;
convert, by the interpreter application, the first portion of the speech data to first text data associated with the first voice caller of the two or more voice callers and the second portion of the speech data to second text data associated with the second voice caller of the two or more voice callers; and
provide the first text data and the second text data to the non-voice callee with a first indication of the first gender of the first voice caller and a second indication of the second gender of the second voice caller.

9. The system of claim 8, the computer-executable instructions when executed further causing the at least one processor to:
analyze the first portion of the speech data to determine a first identity of the first voice caller and the second portion of the speech data to determine a second identity of the second voice caller; and
provide the first text data with a first voice caller identifier of the first voice caller and the second text data with a second voice caller identifier of the second voice caller.

10. The system of claim 8, wherein the interpreter application is associated with a service.

11. The system of claim 8, wherein the voice phone call is a conference call.

12. The system of claim 8, the computer-executable instructions when executed further causing the at least one processor to:
analyze the first portion of the speech data to determine the first gender of the first voice caller and the second portion of the speech data to determine the second gender of the second voice caller.

13. The system of claim 12, wherein the first gender is different than the second gender, and wherein the first indication of the first gender is different than the second indication of the second gender.

14. The system of claim 13, wherein the first indication of the first gender is a first font of the first text data and the second indication of the second gender is a second font of the second text data.

15. The system of claim 12, wherein the first gender is the same as the second gender, and wherein the first indication of the first gender is the same as the second indication of the second gender.

16. The system of claim 8, the computer-executable instructions when executed further causing the at least one processor to:
analyze the first portion of the speech data to determine a first emotional state of the first voice caller and the second portion of the speech data to determine a second emotional state of the second voice caller; and
modify the first text data to indicate the first emotional state of the first voice caller and the second text data to indicate the second emotional state of the second voice caller.

17. The system of claim 16, wherein the first emotional state is different than the second emotional state, and wherein the indication of the first emotional state is different than the indication of the second emotional state.

18. A computer storage medium storing computer-executable instructions that when executed cause at least one processor to:
receive, by an interpreter application used by a non-voice callee, voice call initiation data, wherein the voice call initiation data is operable to establish a voice phone call between the non-voice callee and a voice caller;
receive, by the interpreter application, speech data from the voice caller;
analyze the speech data to determine an identity and a gender of the voice caller;
convert, by the interpreter application, the speech data to text data; and
provide the text data to the non-voice callee with an identifier of the voice caller and in a font associated with the gender of the voice caller.

* * * * *